US008950673B2

(12) United States Patent
Madej et al.

(10) Patent No.: US 8,950,673 B2
(45) Date of Patent: Feb. 10, 2015

(54) IMAGING SYSTEM FOR READING TARGET WITH MULTIPLE SYMBOLS

(75) Inventors: Dariusz J. Madej, Shoreham, NY (US); Miroslav Trajkovic, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 336 days.

(21) Appl. No.: 11/897,500

(22) Filed: Aug. 30, 2007

(65) Prior Publication Data
US 2009/0057411 A1 Mar. 5, 2009

(51) Int. Cl.
*G06K 7/10* (2006.01)

(52) U.S. Cl.
CPC .................... *G06K 7/10861* (2013.01)
USPC ........................................ 235/454

(58) Field of Classification Search
USPC .......................... 235/454, 462.07
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,038,392 A | 8/1991 | Morris et al. | |
| 5,218,190 A * | 6/1993 | Hardesty et al. | 235/462.01 |
| 5,304,786 A | 4/1994 | Pavlidis et al. | |
| 5,703,349 A | 12/1997 | Meyerson et al. | |
| 5,717,221 A * | 2/1998 | Li et al. | 250/566 |
| 7,004,393 B2 | 2/2006 | Schum et al. | |
| 2004/0062443 A1* | 4/2004 | Yen et al. | 382/209 |
| 2004/0108382 A1* | 6/2004 | Schum et al. | 235/462.08 |
| 2005/0067496 A1 | 3/2005 | Yen et al. | |
| 2006/0283952 A1* | 12/2006 | Wang | 235/462.01 |
| 2007/0078558 A1* | 4/2007 | Glynn | 700/215 |
| 2007/0119941 A1* | 5/2007 | He | 235/462.15 |
| 2007/0154098 A1 | 7/2007 | Geva et al. | |

FOREIGN PATENT DOCUMENTS

WO WO2009/029654 3/2009

OTHER PUBLICATIONS

International Search Report and the Written Opinion of the International Searching Authority for PCT/US2008/074443 mailed Oct. 22, 2008, a foreign counterpart.
International Preliminary Report on Patentability mailed on Mar. 11, 2010 in counterpart International Application No. PCT/US2008/074443.
Chinese Office Action Dated May 3, 2012 for Counterpart Application 200880104131.7.
Chinese Office Action Dated Jan. 29, 2013 for Counterpart Application 200880104131.7.
Chinese Office Action Dated July 2, 2013 for Counterpart Application 200880104131.7.

* cited by examiner

*Primary Examiner* — Michael G Lee
*Assistant Examiner* — David Tardif
(74) *Attorney, Agent, or Firm* — Nong-Qiang Fan

(57) ABSTRACT

An imaging system for acquiring images of multiple indicia, such as symbols and non-symbols, on a target, such as a label, comprises a solid-state imager having an array of image sensors for capturing light from the indicia on the target over a field of view, and a controller having a stored template that identifies details of the indicia on the target, for controlling the imager to capture the light from the indicia based on the details identified by the template.

18 Claims, 3 Drawing Sheets

IMAGING SYSTEM FOR READING TARGET WITH MULTIPLE SYMBOLS

DESCRIPTION OF THE RELATED ART

Solid-state imaging systems have been used to electro-optically read one-dimensional bar code symbols, particularly of the Universal Product Code (UPC) type, each having a row of bars and spaces spaced apart along one direction, and two-dimensional symbols, such as Code 39, which introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

The solid-state imaging system includes an imager having a one- or two-dimensional array of cells or photosensors, which correspond to image elements or pixels in a field of view of the imager. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use a solid-state imaging system for capturing a monochrome image of a symbol as, for example, disclosed in U.S. Pat. No. 5,703,349. It is also known to use a solid-state imaging system with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

There are applications where a label or analogous target contains several bar code symbols, both one- and two-dimensional, as well as non-symbols such as a picture of a human face, human-readable alphanumeric data, and a signature, that are used to identify numerous pieces of information concerning an item or a person. Some examples of such applications include shipping labels in the shipping industry, blood bag labels for blood banks, and driver's licenses for driver identification. It might often be necessary that several, or possibly even all, of the symbols and non-symbols, both hereinafter sometimes collectively termed as indicia, presented on the single target have to be scanned in order to retrieve complete data regarding an object, i.e., a package, or a person. Although processing the indicia presented on a single target, one by one, each in its turn, is possible, it is tedious and slow.

Imaging systems, which are capable of processing multiple indicia present in a field of view of the imager at a single manual actuation of the imaging system, are known in the art. Yet such known systems require an exhaustive searching through an entire image of the entire field of view and, thus, come at the price of a long processing time. Typically, a computer program, in a process known as segmentation, analyzes the entire image looking for some regions of interest, e.g., the symbols and non-symbols, usually starting from a center of the image and working outwardly in time fragments or segments. Once the regions of interest are identified, they are typically further processed, for instance, by decoding a symbol, or by verifying a signature, and so on. Sometimes, if one of the symbols and non-symbols cannot be read, for example, by not being entirely included in the image, then, after analysis of the complete image, the system has to acquire another image and analyze it all over again until the missing symbol or non-symbol can be read. This still further increases the processing time.

Image size in such known systems is on the order of one to two million pixels. Since many processing operations have to be executed using each pixel, the time needed to analyze an entire image might be as high as a few hundred milliseconds and, thus, a user often perceives the reading as "slow", since a high performance system will typically perform reading in less than 50 milliseconds. Of course, a very powerful microprocessor could be used to reduce the processing time; yet, this would significantly increase the cost, power consumption, size and complexity of electronic circuitry in the system, not to mention cause other problems such as dissipation of waste heat produced by the powerful microprocessor.

SUMMARY OF THE INVENTION

One feature of the present invention resides, briefly stated, in an imaging system for, and a method of, acquiring images of multiple indicia, e.g., one- and/or two-dimensional symbols and non-symbols, on a target, such as a label. The system includes a solid-state imager having an array of image sensors for capturing light from the indicia on the target over a field of view. Preferably, the array is a CCD or a CMOS array. The system further includes a controller having a stored template that identifies details of the indicia on the target, for controlling the imager to capture the light from the indicia based on the details identified by the template. Multiple indicia can be easily and efficiently processed since detailed information about the structure of the label and the indicia is known in advance by the system.

Preferably, the template identifies each position of the symbols on the label. The template further advantageously identifies at least one of a symbology to identify a type of each symbol, an image density of each symbol, a height of each symbol, and a width of each symbol, on the label. More particularly, the template identifies each corner position of each symbol on the label and each corner position of the label.

Hence, the template identifies a set of bar code symbols presented on the label by their symbology, length, density, size (height-width), and position. That information is compiled and stored in a memory accessed by the controller. Once the system is actuated, for example by pulling a trigger, an image is acquired, and the first symbol from the set is decoded. Then, the controller may use the template to predict where in the image to search for the remaining symbols and non-symbols.

Knowing the expected location of the next symbol speeds up searching for it, since only a limited number of the image pixels would have to be examined in order to identify and decode the next symbol, or yield a conclusion that the system is decoding a single symbol, rather then a multiple symbol label. Moreover, knowing the densities at which symbols are printed, would help the controller to compute image "scale", and use it to predict whether decimation can be used to skip pixels and speed up processing of symbols with a high number of pixels per module (PPM). Processing times are shortened, because the controller is restricted to decoding a specific symbology and a specific symbol length for one-dimensional symbols or size for two-dimensional symbols.

Another feature of the present invention resides in storing the template by having the imager capture light from a unique programming symbol operative for programming the controller to store the template. This programming symbol is different from other symbols used to identify a person or object.

When different types of labels are to be read by the same system, then different templates are stored.

In the preferred embodiment, the system includes a housing having a window; and an illuminator in the housing for illuminating the target with illumination light directed from an illuminating light source to and through the window. The illuminating light source preferably includes one or a plurality of light emitting diodes (LEDs).

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
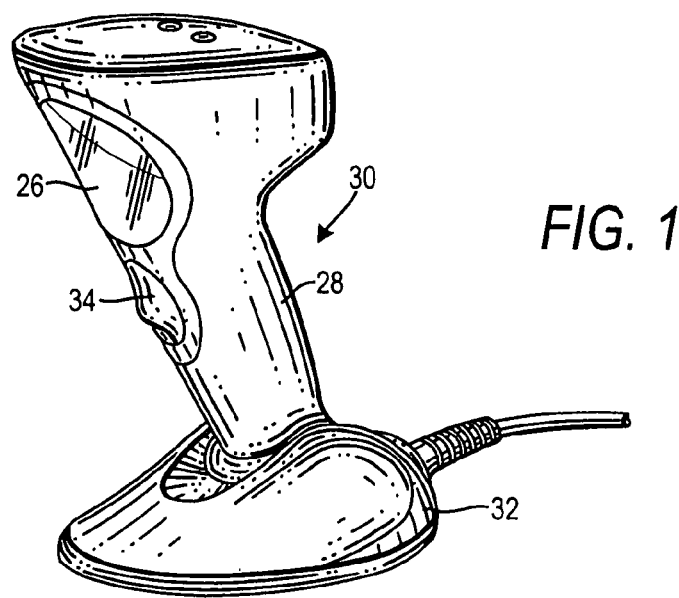
FIG. 1 is a perspective view of a portable imaging system operative in either a hand-held mode, or a workstation mode, for capturing light from a target having multiple indicia.

Reference numeral 30 in FIG. 1 generally identifies an imaging system having a generally vertical window 26 and a gun-shaped housing 28 supported by a base 32 for supporting the imaging system 30 on a countertop. The imaging system 30 can thus be used as a stationary workstation in which products are slid or swiped past the vertical window 26, or can be picked up off the countertop and held in the operator's hand and used as a handheld imaging system in which a trigger 34 is manually depressed to initiate imaging of a target. In another variation, the base 32 can be omitted.

Figure 2:
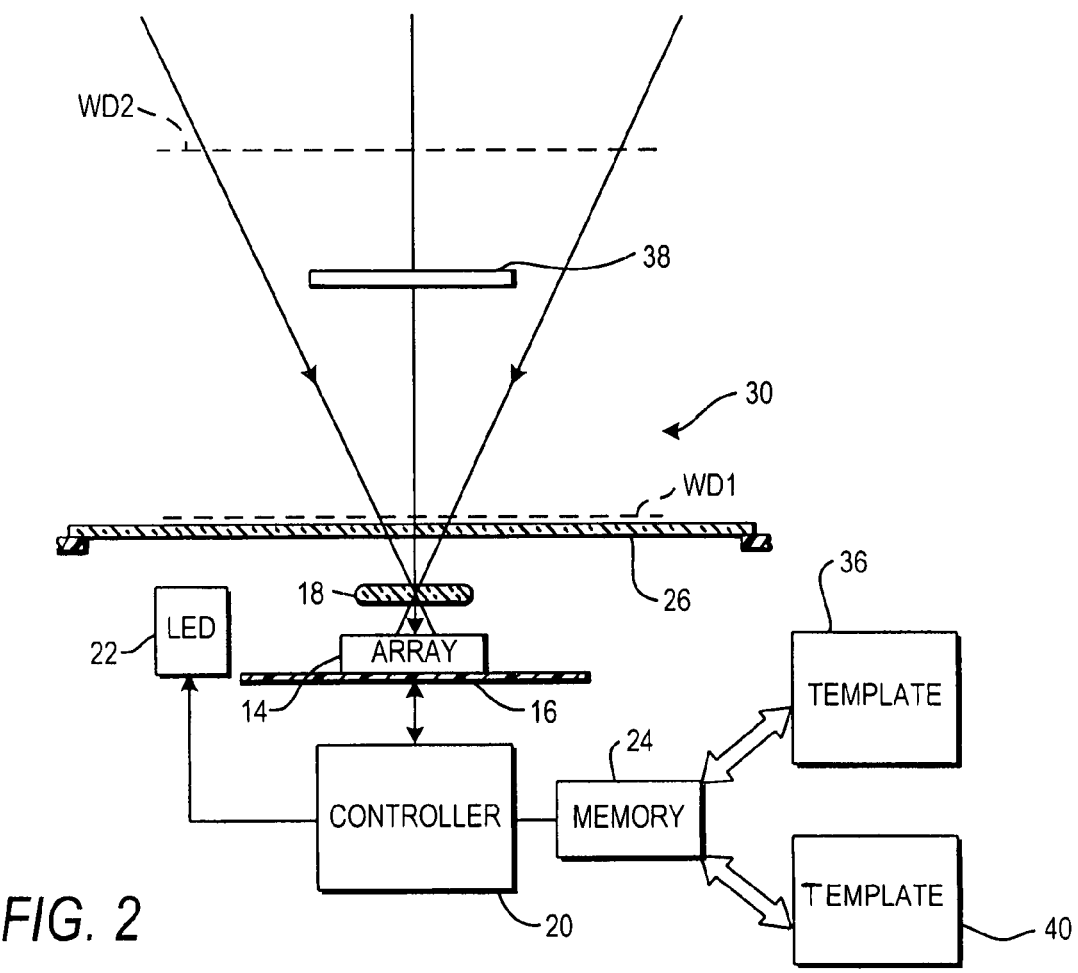
FIG. 2 is a schematic diagram of various components of the system of FIG. 1.

As schematically shown in FIG. 2, an imager 14 is mounted on a printed circuit board 16 in the imaging system. The imager 14 is a solid-state device, for example, a CCD or a CMOS imager and has a one- or two-dimensional array of addressable image sensors operative for capturing light captured and projected by an imaging lens 18 through the window 26 from a target 38, for example, a one- and/or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 40 and generally coincides with the window 26, and WD2 is about eight inches from the window 26.

An illuminator is also mounted in the imaging system and preferably includes one, e.g., light emitting diode (LED) 22, or a plurality of light sources arranged to uniformly illuminate the target. As shown in FIG. 2, the imager 14 and the illuminator LED 22 are operatively connected to a controller or microprocessor 20 operative for controlling the operation of these components. Preferably, the microprocessor is the same as the one used for decoding light scattered from the symbols and for processing the captured target images.

In operation, the microprocessor 20 sends a command signal to pulse the illuminator LED 22 for a short time period, say 500 microseconds or less, and energizes the imager 14 to collect light from a target only during said time period. A typical array needs about 33 milliseconds to acquire the entire target image and operates at a frame rate of about 30 frames per second. The array may have on the order of one million addressable image sensors.

Figure 3:
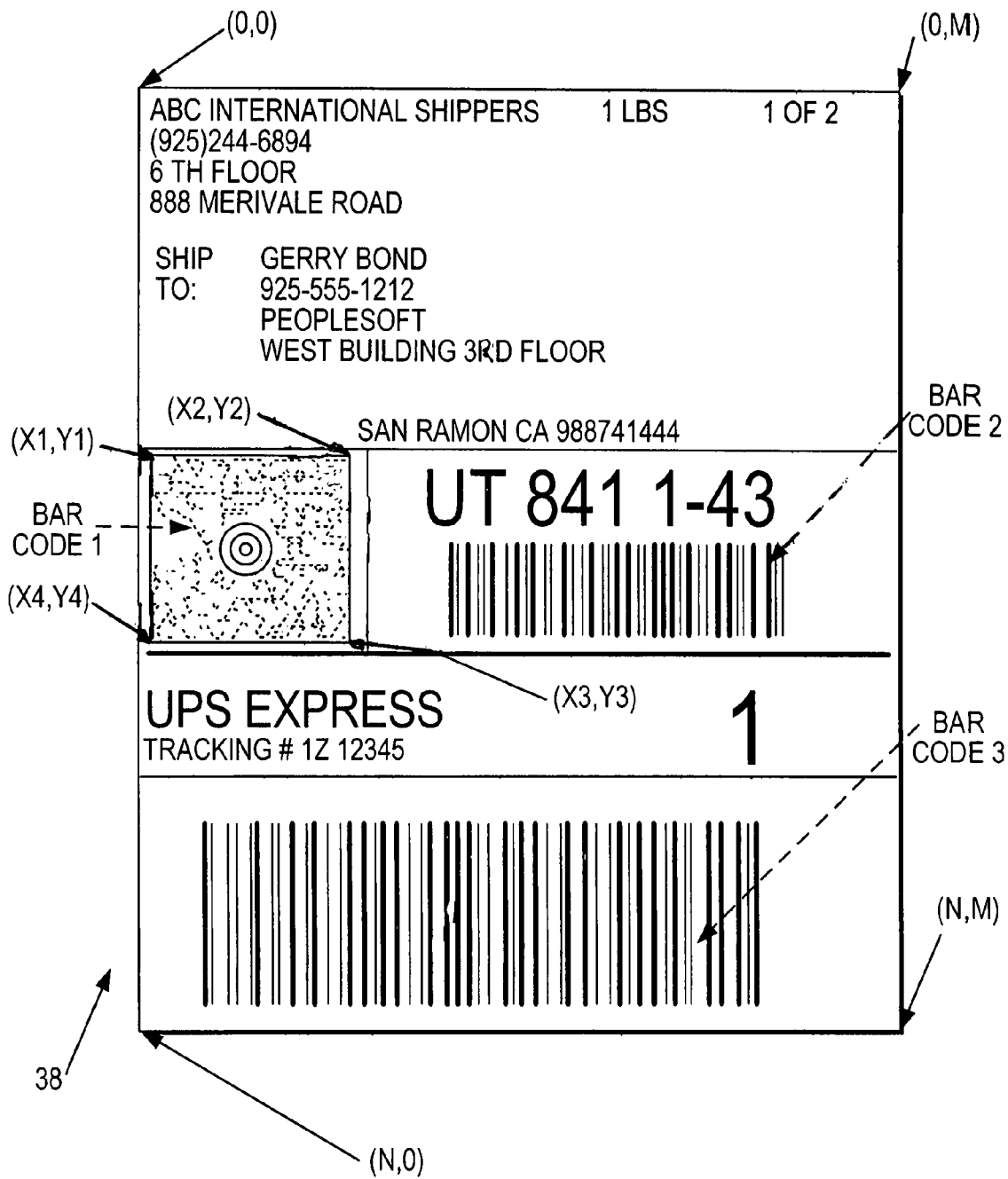
FIG. 3 is a depiction of a label having multiple symbols and non-symbols thereon to be read by the system of FIG. 1, including positional information stored on a template.

In accordance with this invention, as best seen in FIG. 3, multiple indicia, e.g., one- and/or two-dimensional symbols and non-symbols, are provided on the target 38, such as by being printed on a label. A template 36 is stored in a memory 24 accessed by the controller 20, as shown in FIG. 2. The template 36 identifies details of the indicia on the target 38, for controlling the imager 14 to capture the light from the indicia based on the details identified by the template 36. Multiple indicia can thus be easily and efficiently processed since detailed information about the structure of the label and the indicia is known in advance by the system.

As shown in FIG. 3, the corners of the image of the label have position coordinates (0,0), (0,M), (N,M) and (N,0) as considered in a clockwise direction, where N is the image height, and M is the image width. Within this coordinate system, the template 36 describes all the information, which is a priori known about each of the three illustrated symbols 1, 2 and 3, which information is used by the controller 20 to shorten processing time.

By way of example, bar code symbol 1 can be identified by the position coordinates of an upper left corner (X1,Y1), the position coordinates of an upper right corner (X2,Y2), the position coordinates of a lower right corner (X3,Y3), and the position coordinates of a lower left corner (X4,Y4). Bar code symbol 1 can also be identified by its symbology (Maxicode), its image density (25 mils), and its image size (34×34 modules).

Similarly, bar code symbol 2 can be identified by the position coordinates of an upper left corner, an upper right corner, a lower right corner, and a lower left corner. Bar code symbol 2 can also be identified by its symbology (Code 128), its image density (15 mils), its code length (15 characters), and its fixed pattern ("12").

Similarly, bar code symbol 3 can be identified by the position coordinates of an upper left corner, an upper right corner, a lower right corner, and a lower left corner. Bar code symbol 3 can also be identified by its symbology (Code 128), its image density (15 mils), its code length (18 characters), and its fixed pattern ("ABC").

Image processing, according to this invention, is initiated by acquiring the image, and then processing the image, starting either from a center of the image, as described above, or from a known starting location pointed at by an aiming light subsystem. Image processing continues until a first bar code symbol is located and decoded. See step 44 in the flow chart of FIG. 4. The decoded bar code symbol corner position coordinates can be described as: (DX1,DY1), (DX2,DY2), (DX3,DY3), and (DX4, DY4). Information from the first bar code symbol, such as its symbology, its length, and its format of encoded data (i.e., fixed prefix or suffices) is used to find out which of the symbols in the template has been decoded. For instance, if a 15 character—Code 128 was decoded, then it can be identified as bar code symbol 2 in the template described above.

Figure 4:
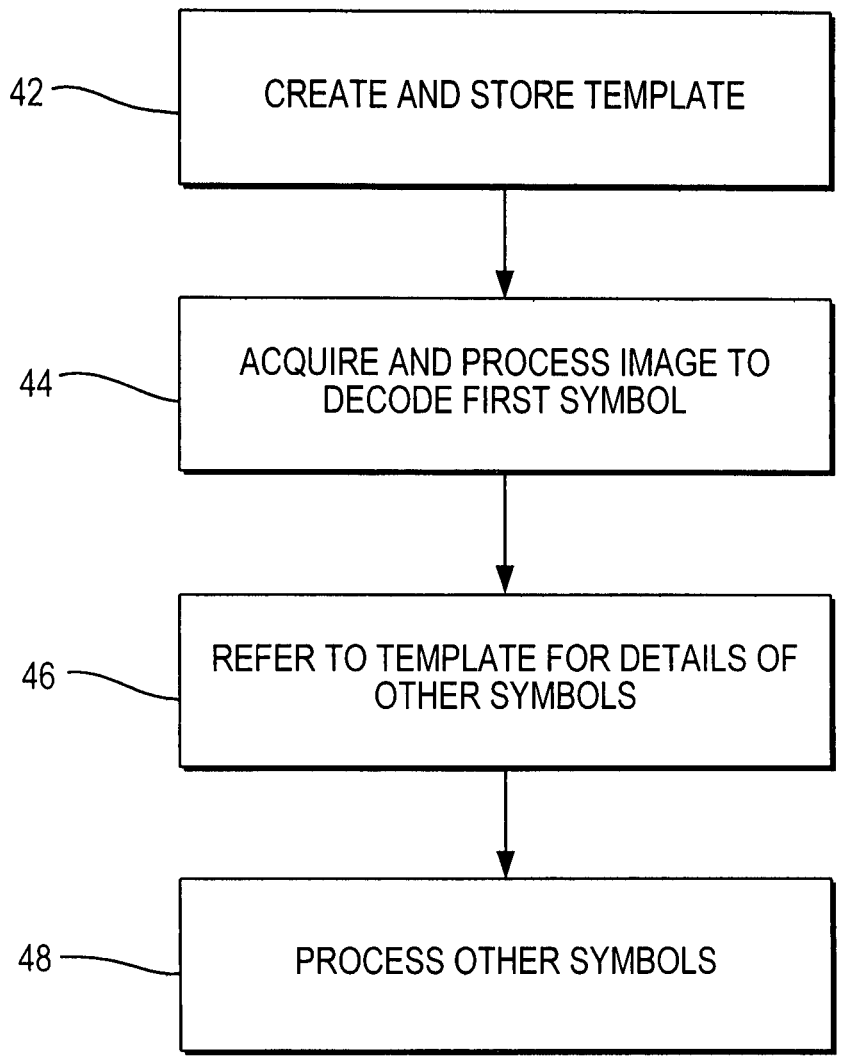
FIG. 4 is a flow chart depicting the operation of the system of FIG. 1.

As shown by step 46 in the flow chart of FIG. 4, access to the template description of the decoded bar code symbol identifies the four corners of a box bounding the bar code symbol. Use of the template bar code symbol coordinates (X1,Y1) . . . (X4,Y4) and the decoded bar code coordinates (DX1,DY1) . . . (DX4,DY4), as well as symbol orientation, can be used to establish a mapping or shift <S> between the template and the image. Mapping defines the offset in the X-direction, the Y-direction, and the Z-direction (depth), as well as rotation in three dimensions. Each point on the template can be predicted for the equivalent position coordinates in the image.

Mapping predicts the coordinates of each bar code symbol from the label defined in the template. Mapping and bar code symbol density information predict the PPM (pixel per module) of each bar code symbol in the template. The PPM tells how many pixels of the image represent a module of a bar code symbol, and represents the width of a narrow bar of a one-dimensional symbol or a size (in pixels) of the smallest dark square of a two-dimensional symbol.

Knowledge of the PPM can be used to optimize the decoding. When the bar code symbol has a high PPM, then the image processing can be sped up, because the controller (decoder) could skip excessive pixels. Conversely, when the PPM is very low, then a special version of the decoder (known as a high blur one-dimensional decoder) could be used to maximize the decoding. Some resolution enhancing techniques (known as super resolution) could also be used to improve the decoding of a two-dimensional symbol.

Image processing processes only fragments of the image at a time. For each fragment, the proper version (i.e., low PPM/high PPM) of the decoder of a given symbology, i.e., a Code 128 decoder or a PDF417 decoder, is selected. In the case of decoding one-dimensional symbols, several attempts to decode the same pattern can be made, and each time a different decoder is used (i.e., Code 39, Code 128, UPC, RSS etc). This continues until a bar code symbol is finally decoded. Knowledge of symbology and bar code length speeds up the decoding process, and also could be used to decrease decoding errors (mis-reads). See step 48 in the flow chart of FIG. 4.

If not all the bar code symbols defined by the template 36 are in the field of view, then the results of the decoding completed so far is stored, and the expected location where the processing of the next image should start is established. For example, if the image of a label from FIG. 3 was processed, and it was established that the bar code symbol 3 was outside the current image, then processing of the next image should start from the bottom of the image, rather then from the center. When all of bar code symbols have been successfully decoded, then a beeper announces that the reading was successful.

The template can be created by using a flat-bed scanner to scan an image of the template. The image should be cropped to contain the label only (no margins). The image can be processed using decoding software similar to the one that runs in a controller 20. As a result, information of all bar code symbol coordinates, types, densities, etc., is collected, and the label template is generated. See step 42 in the flow chart of FIG. 4.

The template is uploaded to the system by encoding the template in a bar code symbol (i.e., PDF 417) and printed, and by having the system read this unique programming symbol. The programming symbol, e.g., printed on a different target 38, informs the controller 20 that it contains programming information, rather than a data bar code. Thus, by scanning this unique programming symbol, information about the template can be transferred to the system and, thus, program it to read a particular type of label.

During the decoding process, when a first bar code symbol is decoded, it is possible to identify which of a set of bar code symbols on a multiple symbol label it is. All labels must be designed in such a way that every bar code symbol is unique; otherwise, it would not be possible to interpret correctly such a label in a situation when each bar code symbol is scanned separately in a random order.

This method is best when the controller 20 is programmed to read a particular type of label. This method can be extended to read more than one type of label with a single system by storing multiple templates, that is template 40 in addition to template 36. If each bar code symbol from two labels (or more) is unique, then after decoding the first bar code symbol, the controller 29 would know which template 36 or 40 to use. If this is not the case, then the controller could sequentially try the templates 36, 40.

It will be understood that each of the elements described above, or two or more together, also may find a useful application in other types of constructions differing from the types described above. Thus, imaging systems having different configurations can be used.

While the invention has been illustrated and described as an imaging reader for reading multiple targets on a single target label, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An imaging system for acquiring images of multiple indicia on a target, comprising:
    a solid-state imager having an array of image sensors for capturing light from the indicia on the target over a field of view to form a target image;
    a controller having a stored template that identifies details of the indicia on the target, for controlling the imager to capture the light from the indicia based on the details identified by the template;
    wherein the target is a label, wherein the indicia includes at least one of a one-dimensional symbol and a two-dimensional symbol applied on the label, and wherein the template identifies a position coordinate of at least one position of at least one symbol in a coordinate frame fixed on the label for determining the position of the at least one symbol in the target image if the position of any point on the label is known in the target image; and
    wherein the template is stored by having the imager capture light from a unique programming symbol operative for programming the controller to store the template that identifies at least a type of each symbol and identifies the position coordinate of at least one position of the at least one symbol.

2. The system of claim 1, wherein the template further identifies a height of each symbol, and a width of each symbol, on the label.

3. The system of claim 1, wherein the template identifies each corner position of each symbol on the label and each corner position of the label.

4. The system of claim 1, wherein the controller has another stored template, each template identifying details of the indicia on different targets.

5. The system of claim 1, wherein the template further identifies an image density of each symbol.

6. The system of claim 1, wherein the template identifies a position coordinate of at least one corner position of at least one symbol.

7. An imaging system for acquiring images of multiple indicia on a target, comprising:
   means having an array of image sensors for capturing light from the indicia on the target over a field of view to form a target image;
   control means having a stored template means for identifying details of the indicia on the target, for controlling the sensors to capture the light from the indicia based on the details identified by the template means;
   wherein the target is a label, wherein the indicia includes at least one of a one-dimensional symbol and a two-dimensional symbol applied on the label, and wherein the template means identifies a position coordinate of at least one position of at least one symbol in a coordinate frame fixed on the label for determining the position of the at least one symbol in the target image if the position of any point on the label is known in the target image; and
   wherein the template means is stored by having the sensors capture light from a unique programming symbol operative for programming the control means to store the template that identifies at least a type of each symbol and identifies the position coordinate of at least one position of the at least one symbol.

8. The system of claim 7, wherein the template means further identifies a height of each symbol, and a width of each symbol, on the label.

9. The system of claim 7, wherein the template means identifies each corner position of each symbol on the label and each corner position of the label.

10. The system of claim 7, wherein the control means has another stored template means, each template means identifying details of the indicia on different targets.

11. The system of claim 7, wherein the template means further identifies an image density of each symbol.

12. The system of claim 7, wherein the template means identifies a position coordinate of at least one corner position of at least one symbol.

13. A method of acquiring images of multiple indicia on a target, comprising the steps of:
   capturing light from the indicia on the target with a solid-state imager having an array of image sensors over a field of view to form a target image;
   storing details of the indicia on the target on a template;
   controlling the imager to capture the light from the indicia based on the details stored by the template;
   configuring the target as a label to includes at least one of a one-dimensional symbol and a two-dimensional symbol, and identifying a position coordinate of at least one position of at least one symbol in a coordinate frame fixed on the label with the template for determining the position of the at least one symbol in the target image if the position of any point on the label is known in the target image; and
   capturing light from a unique programming symbol for storing the template that identifies at least a type of each symbol and identifies the position coordinate of at least one position of the at least one symbol.

14. The method of claim 13, and identifying a height of each symbol, and a width of each symbol, on the label with the template.

15. The method of claim 13, and identifying each corner position of each symbol on the label and each corner position of the label with the template.

16. The method of claim 13, and storing details of the indicia on a different target on a different template.

17. The method of claim 13, and identifying position coordinate of at least one corner position of at least one symbol.

18. The method of claim 13, wherein the template further identifies an image density of each symbol.

\* \* \* \* \*